(12) United States Patent
Bucknell et al.

(10) Patent No.: US 8,934,399 B2
(45) Date of Patent: Jan. 13, 2015

(54) WIRELESS COMMUNICATION SYSTEM AND METHOD FOR MAPPING OF CONTROL MESSAGES ON THE UN-INTERFACE

(71) Applicant: Fujitsu Limited, Kawasaki-shi, Kanagawa (JP)

(72) Inventors: Paul Bucknell, Brighton (GB); Zhaojun Li, Guildford (GB)

(73) Assignee: Fujitsu, Limited, Kawasaki (JP)

( * ) Notice: Subject to any disclaimer, the term of this patent is extended or adjusted under 35 U.S.C. 154(b) by 113 days.

(21) Appl. No.: 13/742,799

(22) Filed: Jan. 16, 2013

(65) Prior Publication Data
US 2013/0136078 A1    May 30, 2013

Related U.S. Application Data

(63) Continuation of application No. PCT/EP2010/061408, filed on Aug. 5, 2010.

(51) Int. Cl.
*H04B 7/14* (2006.01)
*H04W 72/10* (2009.01)
*H04W 28/06* (2009.01)
*H04W 84/04* (2009.01)
(Continued)

(52) U.S. Cl.
CPC .............. *H04W 72/10* (2013.01); *H04W 28/06* (2013.01); *H04W 84/047* (2013.01); *H04B 7/2606* (2013.01); *H04W 72/12* (2013.01); *H04W 76/02* (2013.01); *H04W 88/08* (2013.01)
USPC ............................ 370/315; 370/522; 370/537

(58) Field of Classification Search
CPC ..... H04W 36/00; H04W 36/08; H04W 36/30; H04W 36/38; H04W 41/00; H04W 41/02; H04W 41/22; H04W 72/10; H04W 88/00; H04W 88/04
USPC ........................... 370/250–350; 455/400–525
See application file for complete search history.

(56) References Cited

U.S. PATENT DOCUMENTS 8,644,341 B1 * 2/2014 Petranovich ................... 370/474
2009/0086705 A1 * 4/2009 Zisimopoulos et al. ...... 370/347
(Continued)

FOREIGN PATENT DOCUMENTS

EP      2259651     12/2010

OTHER PUBLICATIONS

International Search Report issued for corresponding International Patent Application No. PCT/EP2010/061408, mailed May 19, 2011.
(Continued)

*Primary Examiner* — Kevin C Harper
(74) *Attorney, Agent, or Firm* — Myers Wolin, LLC (57) ABSTRACT

An LTE mobile communication system in which relays RN (14), each in communication with a donor eNB (13) are used to improve the coverage of high data rates, the cell-edge throughput and/or to increase system throughput. The problem addressed is that in the RN←→DeNB (13) Un interface, all the S1-AP and/or X2-AP messages with different QoS requirements (for example different S1-AP/X2-AP messages that have different time criticalities) have to be delivered in a limited number of Data or Signalling Radio Bearers. A multiplexing mechanism enables the categorization of different types of S1-AP and/or X2-AP messages and the mapping of these to a limited number of Radio Bearers over the Un radio interface.

14 Claims, 7 Drawing Sheets

(51) Int. Cl.
*H04B 7/26* (2006.01)
*H04W 72/12* (2009.01)
*H04W 76/02* (2009.01)
*H04W 88/08* (2009.01)

(56) References Cited

U.S. PATENT DOCUMENTS

2010/0260096 A1* 10/2010 Ulupinar et al. ............... 370/315
2011/0103294 A1* 5/2011 Liu et al. ....................... 370/315
2012/0120831 A1* 5/2012 Gonsa et al. ................... 370/252

OTHER PUBLICATIONS

Institute for Information Industry (III) et al.; "L2 and RRM issues on the Un Interface"; Agenda Item: 7.4.2; 3GPP TSG-RAN2#67bis; R2-095588; Miyazaki, JP; Oct. 12-16, 2009.

Institute for Information Industry (III) et al.; "Investigating head-of-line blocking issue among four relay alternatives"; Agenda Item: 15.1.3; 3GPP TSG-RAN WG3 #66; R3-092735; Jeju, Korea; Nov. 9-13, 2009.

Institute for Information Industry (III) et al.; "Results of off-line discussions on comparison metrics for relay architectures"; Agenda Item: 15.1.1; 3GPP TSG-RAN WG3 #66bis; R3-100425; Valencia, Spain; Jan. 18-22, 2010.

Qualcomm Incorporated; "Un Bearer Management for Dynamic Uu-Un Bearer Mapping"; Agenda Item: 15.1; 3GPP TSG-RAN WG3 #68; R3-101603; Montreal, Canada; May 10-14, 2010.

Ericsson; "RN OAM Requirments"; 3GPP TSG-RAN3 Meeting AH; R3-101969 (Change Request for R3-101957 from version 9.4.0 to version 10.0.0); Beijing, China; Jun. 29-Jul. 1, 2010.

ETSI TS 136 300 V8.12.0; LTE; Evolved Universal Terrestrial Radio Access (E-UTRA) and Evolved Universal Terrestrial Radio Access Network (E-UTRAN); Overall description; "Stage 2" (3GPP TS 36.300 version 8.12.0 Release 8); Apr. 2010.

ETSI TS 136 321 V8.7.0; LTE; Evolved Universal Terrestrial Radio Access (E-UTRA); "Medium Access Control (MAC) protocol specification" (3GPP TS 36.321 version 8.7.0 Release 8); Sep. 2009.

ETSI TS 136 323 V8.6.0; LTE; Evolved Universal Terrestrial Radio Access (E-UTRA); "Packet Data Convergence Protocol (PDCP) specification" (3GPP TS 36.323 version 8.6.0 Release 8); Jul. 2009.

* cited by examiner

(1) User Plane (2) Control Plane

WIRELESS COMMUNICATION SYSTEM AND METHOD FOR MAPPING OF CONTROL MESSAGES ON THE UN-INTERFACE

CROSS REFERENCE TO RELATED APPLICATION

The present Application is a continuation of Application PCT/EP2010/061408, filed Aug. 5, 2010, the entire contents of which are wholly incorporated herein by reference.

FIELD OF THE INVENTION

This invention generally relates to a mobile communication system or network and in particular, to a method of transmitting and receiving data in such a system using Relay Nodes (RNs) where RNs provide the same functionality as conventional base stations and whose link to the network is provided using a similar radio interface as used by the mobile devices that connect to the base station. More particularly, but not exclusively, the present invention relates to Type 1 RNs in an LTE-Advanced (LTE-A) network.

BACKGROUND OF THE INVENTION

Next generation mobile communications such as the Universal Mobile Telecommunications System (UMTS) and the UMTS Long Term Evolution (LTE) aim to offer improved services to the user compared to the existing systems. These systems are expected to offer high data rate services for the processing and transmission of a wide range of information, such as voice, video and IP multimedia data.

LTE is a packet-based technology for the delivery of high speed data services with increased data rates for the users. Compared to UMTS and previous generations of mobile communication systems, LTE will also offer reduced delays, increased cell edge coverage, reduced cost per bit, flexible spectrum usage and multi-radio access technology mobility.

LTE has been designed to give peak data rates in the downlink (DL) (communication from a base station (BS) to a subscriber station or user equipment (UE) of >100 Mbps whilst in the uplink (UL) (communication from the UE to the BS) >50 Mbps.

Figure 1:
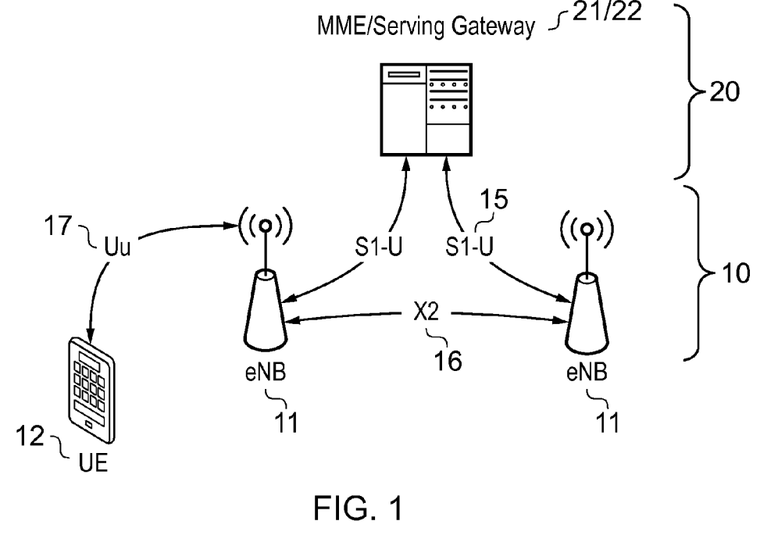
FIG. 1 shows a conventional (non-relay) system architecture in LTE.

The basic system architecture in LTE is illustrated in FIG. 1. As can be seen, each UE 12 connects over a wireless link via a Uu interface to an eNB 11, which defines one or a number of cells for wireless communication. There is a network of eNBs referred to as the "eUTRAN" 10.

Each eNB 11 in turn is connected by a (usually) wired link using an interface called S1 to higher-level or "core network" entities, including a Serving Gateway (S-GW 22), and a Mobility Management Entity (MME 21) for managing the system and sending control signalling to other nodes, particularly eNBs, in the network. In addition, a PDN [Packet Data Network] Gateway (P-GW 23, FIG. 2) is present, separately or combined with the S-GW 22, to exchange data packets with any packet data network including the Internet. The wired links to the core network EPC 20 (where EPC stands for Evolved Packet Core) are referred to as "back haul" and will employ Internet Protocol (IP), over existing broadband infrastructure in homes and offices.

In FIG. 1, the S1 interface is labelled S1-U, the suffix—U denoting the user plane employed by the eNBs 11 for communicating user data to and from the S-GW 22. The S-GW is responsible for packet forwarding of user data on the downlink to the UE 12 and on the uplink. The S-GW 22 provides a "mobility anchor" for the user plane during handovers of a UE 12 from one eNB 11 to another. It also manages and stores UE "contexts" which are the details of active connections with UEs including so-called bearers (see below).

In parallel to this, there is an interface S1-MME (sometimes called S1-C) via which the eNBs 11 exchange control messages with the MME 21. The main function of the MME 21, as its name suggests, is to manage mobility of the UEs 12, and it is a signalling-only entity; in other words, user data packets do not pass through the MME. The MME 21 is also responsible for controlling security (including authenticating users), and for EPS bearer control (see below). In practice, there may be several MMEs forming a MME "pool". One eNB can have several S1-MME interfaces towards several MMEs.

In addition, as shown in FIG. 1, the eNBs 11 communicate among themselves by a (usually) wireless link, using an interface called X2 for mutual co-ordination, for example when handing over a UE 12 from one cell to another. There is only one X2 interface between two eNBs.

In the above configuration, communications among eNBs can be regarded as communications among peers (network nodes at the same hierarchical level) with the MME constituting a higher level entity in the system.

A further aspect of the control signalling relates to so-called Operations, Administration, Maintenance (OAM). By exchanging OAM signalling with an OAM server (not shown), the RNs and eNBs can co-ordinate their actions, making the network self-organizing at least to some extent.

Separating the management functions from the handling of user data traffic—in other words, splitting the user plane from the control plane—allows the respective hardware resources (MMEs, S-GW) to be scaled independently as required for the number of users and volume of traffic. A multi-vendor arrangement is also possible, in which service providers deploy their own core networks 20 but use the same eUTRAN 10.

The concept of "bearers" is important for achieving quality-of-service (QoS) in a packet-based network such as LTE. In general, a "bearer" can be thought of as an information transmission path of defined capacity, delay and bit error rate, etc. so as to enable a given service or control function to be provided. Various types or levels of bearer can be established, the radio part being set up using radio resource control or RRC.

Figure 2:
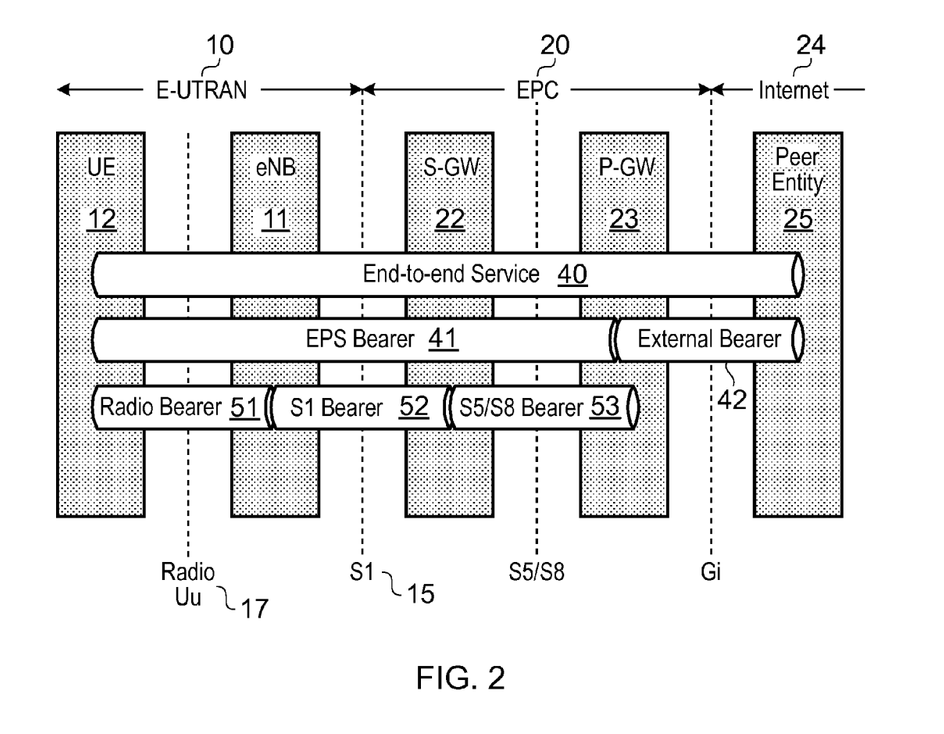
FIG. 2 shows bearers in an LTE system.

FIG. 2 shows an EPS Bearer Service Architecture proposed for LTE. The left side of the Figure represents the eUTRAN 10 with the EPC 20 occupying the middle part of the Figure. At the right-hand side, outside the LTE system as such, there is the Internet 24. The vertical bars represent the main entities in the user plane, from the UE 12 to eNB 11 through to S-GW 22 and P-GW 23, terminating in a peer entity (such as an Internet web server 25) connected to the P-GW 23. To provide an end-to-end service 40 between the UE 12 and Peer Entity 25 (as indicated by the upper horizontal band in the figure), the system sets up "bearers" as shown. An EPS Bearer 41 represents the entire connection within the LTE system; it constitutes a QoS flow for a particular service. The connection continues outside the LTE system via an External Bearer 42.

The EPS Bearer 41 is made up, in turn, of a radio bearer 51 over the link between the UE 12 and eNB 11, and an S1 Bearer 52 between the eNB 11 and S-GW 22. A further Bearer (S5/S8 Bearer 53) is set up between the S-GW 22 and P-GW 23. Each Bearer can be regarded as a "tunnel" in a given protocol layer for transport of packets, connecting the end points for the duration of a particular service or "session", e.g. voice call or download. Thus, the radio bearer 51 transports the packets of the higher-layer EPS Bearer 41 between the UE 12 and eNB 11, and the S1 Bearer 52 transports the packets of the EPS Bearer 41 between the eNB 11 and S-GW 22. Bearer control through RRC, mentioned previously, includes the setting up of bearers for a particular session so as to ensure sufficient QoS, taking into account the resource situation in the E-UTRAN 10 and existing sessions already in progress. It also involves the modification and release of radio bearers.

Bearers are also defined in the signalling plane. As currently proposed, LTE employs the known SCTP protocol (see below) for transmitting signalling messages between an eNB 11 and MME 21, or between two eNBs. To be precise, SCTP is used in the transport layer of an S1 or X2 signalling bearer as the case may be. This requires a so-called SCTP association setup to be performed between the eNB and MME, or between the two eNBs.

LTE-Advanced (LTE-A), currently being standardised, will further improve the LTE system, using new techniques to improve the performance over existing LTE systems, providing higher data rates (up to 1 Gbps DL, 500 Mps UL) and improvements to cell edge coverage. Support for relay nodes (RNs) is part of this effort.

Currently being considered are so-called "Type 1" RNs. These are relays which connect to the network "in-band", in other words using the same frequency band(s) as UEs, and which set up their own cells such that each RN appears to a UE to be like an eNB. Thus, a UE attached to a given RN communicates with the RN via the Uu interface, just as it would with an eNB. In other words the RN acts like an eNB to a great extent. The "in-band" radio interface between the RNs and eNBs is called Un, to distinguish it from Uu.

Transmission of messages between nodes in a radio network, such as between the RNs and eNBs, involves the use of multi-layer protocol stacks. On the transmission side, starting from the top of the stack at an application layer, each layer in the protocol stack processes units of data in some way, usually adding a header to the data unit before passing it down to the next lower layer or sub-layer. The headers include fields identifying the operations performed at that protocol layer. On the reception side, each layer decodes the header inserted in the corresponding transmission-side layer to allow reconstruction of a data unit, which is then passed up to the next higher layer.

Figure 3:
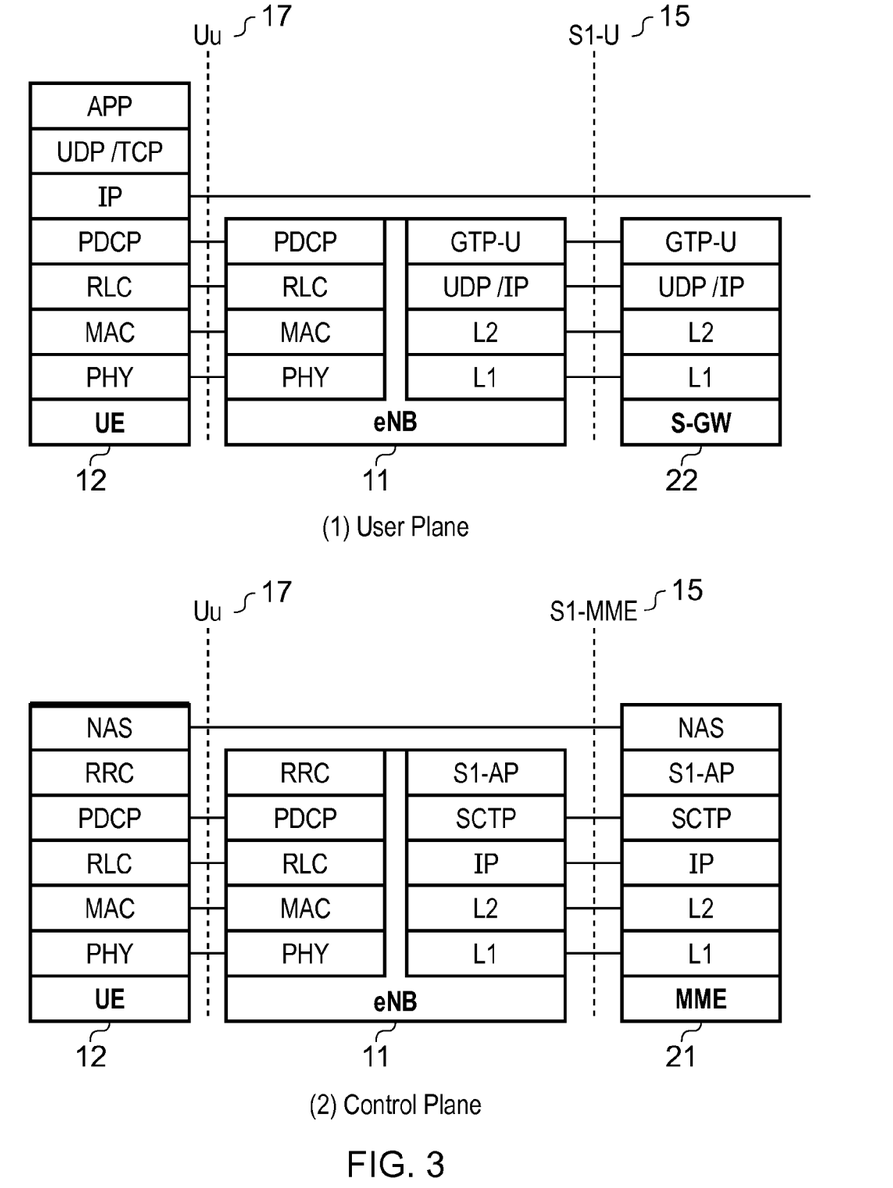
FIG. 3 shows the protocol layers for (1) the User plane and (2) the Control Plane in an LTE system.

Via the two radio interfaces (Uu and Un), user data traffic is transported by the User-Plane, consisting of Packet Data Convergence Protocol (PDCP), Radio Link Control (RLC), Medium Access Control (MAC) and PHYsical (PHY) protocol layers. FIG. 3 shows the relationship between the protocol layers for the LTE user plane, labelled (1), and the control plane (2).

A particular concern in the present invention is control signalling via the S1 and X2 interfaces, so this will be explained in more detail with reference to FIGS. 4 and 5.

S1 Control Plane

The S1 control plane interface (S1-MME) is defined on the link between the eNB and the MME. The control plane protocol stack of the S1 interface is shown in FIG. 4. The transport network layer 32 is built on IP transport, similarly to the user plane but for the reliable transport of signalling messages, SCTP 31 is added on top of IP. Lower layers of the protocol stack include a data link layer 33 and the physical layer 34. The data link layer 33, in turn, comprises a Packet Data Convergence Protocol (PDCP) sub-layer, a Radio Link Control (RLC) sub-layer, and a Media Access Control (MAC) sub-layer. The MAC layer forms S1 signalling messages or other data into data units (MAC PDUs) suitable for transmission over the radio network. These are received by the physical layer or PHY, which provides the link from each network node to the radio resources of the network. The application layer signalling protocol is referred to as S1-AP 30 (S1 Application Protocol). There are generally two types of S1-AP message: (a) UE-dedicated messages (specific to an individual UE 12) and (b) messages for common procedures.

As already mentioned, a RN acts like an eNB at least from the viewpoint of a UE. Therefore, in addition to the S1-MME interface between the eNB and MME, a "logical" S1 interface is defined over the whole path between the MME and RN.

X2 Control Plane

The X2 control plane interface (X2-CP) is defined on the link between two neighbour eNBs 11. The control plane protocol stack of the X2 interface is shown on FIG. 5. The transport network layer is built on SCTP 36 on top of IP 36, with data link layer 38 and physical layer 39 as before. The application layer signalling protocol is referred to as X2-AP 35 (X2 Application Protocol).

Again, a logical X2 interface exists from an eNB to an RN, when RNs are employed.

SCTP

Figure 4:
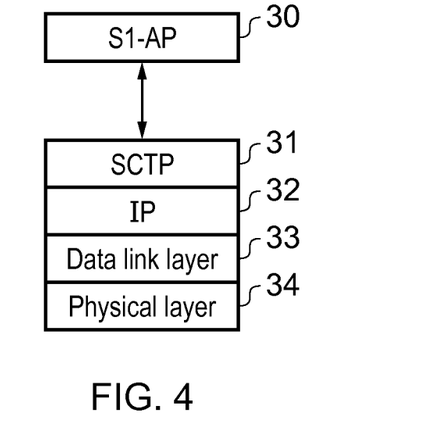
FIG. 4 shows the protocol stack for the S1 control interface in an LTE system.
Figure 5:
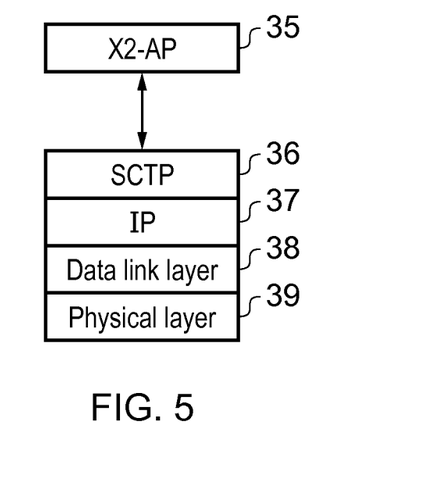
FIG. 5 shows the protocol stack for the X2 control interface in an LTE system.

The SCTP layer 31 or 36 in FIGS. 4 and 5 provides the guaranteed delivery of application layer messages through the SCTP association(s) established between two nodes. Application layer protocols submit their data to be transmitted in messages to the SCTP transport layer. SCTP places messages and control information into separate chunks (data chunks and control chunks), each identified by a chunk header. A message can be fragmented over a number of data chunks, but each data chunk contains data from only one user message. SCTP chunks are bundled into SCTP packets. The SCTP packet, which is submitted to the IP layer, consists of a packet header, SCTP control chunks when necessary, followed by SCTP data chunks when available.

SCTP allows for delivery of chunks within independent streams, to avoid unnecessary head-of-line blocking. Head-of-line blocking (HOL) is a phenomenon that appears in buffered telecommunication network switches. A switch is usually made of buffered input ports, a switch fabric and buffered output ports. Because of the FIFO nature of the input buffers and switch design, the switch fabric can only switch the packets at the head of the buffer per cycle. HOL arises when packets arriving at different input ports are destined for the same output port. If the HOL packet of a certain buffer at the input cannot be switched to an output port because of contention, the rest of the packets in that buffer are blocked by that Head-of-Line packet, even if there is no contention at the destination output ports for those packets. The phenomenon may have severe performance-degrading effects in input-buffered systems.

Each message sent over an SCTP association is assigned to a particular stream. All data within a stream is delivered in order with respect to other data in that stream. Data in different streams have no order constraints. SCTP's resulting parallel ordered streams provide a specific instance of 'partial ordered' delivery. It is SCTP's multi-streaming service that circumvents the head-of-line blocking problem discussed above.

In LTE, a single SCTP association per S1-MME interface instance is used with one pair of stream identifiers for S1-MME common procedures. At least one pair of stream identifiers should be used for S1-MME dedicated procedures. MME communication context identifiers that are assigned by the MME for S1-MME dedicated procedures, and eNB communication context identifiers that are assigned by the eNB for S1-MME dedicated procedures are used to distinguish UE specific S1-MME signalling transport bearers. The communication context identifiers are conveyed in the respective S1-AP messages.

Similarly, in the case of X2 interface, a single SCTP association per X2 interface instance is used, with a single pair of stream identifiers reserved for the sole use of X2-AP elementary procedures that utilize non UE-associated signalling. At least one pair of stream identifiers is reserved for the sole use of X2-AP elementary procedures that utilize UE-associated signalling. However a few pairs (i.e. more than one) should be reserved.

These X2-AP elementary procedures using non UE-associated signalling are also known as common procedures. These procedures include Reset, X2 Setup, eNB Configuration Update, Resource Status Reporting Initiation, Mobility Settings Change, Load Indication, Resource Status Reporting, Error Indication, Radio Link Failure Indication, Handover Report and Cell Activation. These procedures are not associated with any specific UE.

In addition, there is the signalling associated with Operations, Administration, Maintenance (OAM) as already mentioned.

There is only limited provision for data bearers (SRBs and DRBs) over the Un interface. Consequently there is the problem that in the RN←→DeNB Un interface, all the S1-AP, X2-AP and/or OAM messages with different QoS requirements (for example different S1-AP/X2-AP messages that have different time criticalities) have to be delivered in a limited number of DRBs or SRBs. This problem is fundamentally a Head of Line (HOL) blocking issue that arises when packets arriving at different input ports are destined for the same output port.

SUMMARY OF THE INVENTION

According to a first aspect of the present invention, there is provided a wireless communication system in which subscriber stations are arranged for wireless communication with a relay station acting as a base station for those subscriber stations, wherein: the relay station is arranged for wireless communication with a donor base station via a first interface; the donor base station is arranged for wired and/or wireless communication with peer nodes and/or other nodes of the system, via at least one second interface; the first interface provides radio bearers for sending user data and control messages between the donor base station and the relay station; and the or each second interface has at least one protocol for sending control messages with differing priorities; characterised in that the donor base station and the relay station each comprise a mechanism to combine a plurality of the control messages into one of the radio bearers by taking account of their respective priorities, for sending via the first interface.

For example, the first interface may be Un as defined in LTE-A, and the second interface may include at least one of S1 and X2. In a LTE-A-type wireless communication system, the donor base station will be a donor eNB and the radio bearers may be DRBs or SRBs depending on the architecture of the system, as will be explained later.

Preferably, the above mechanism is arranged to determine the priority of a control message from one or more of: a QoS requirement of the control message; the protocol used to send the control message via the second interface; whether the control message originates from a peer node or another node; whether the control message relates to a plurality of subscriber stations or to an individual subscriber station; and whether the control message relates to an emergency. For example, a peer node may be another node of the same kind or hierarchical level as the receiver of the message, whereas other nodes may be higher level in terms of the system architecture. In an LTE-A system peer nodes may be eNBs and other nodes include higher-level nodes such as a MME.

Preferably, the system further comprises at least one organisation and management node for communicating organisation and management messages, and the mechanism is arranged to further to determine the priorities based on whether the control message is an Operations, Administration, Maintenance message.

In the above system, the donor base station and the relay station may be arranged to perform a setup procedure for configuring the first interface, the setup procedure including exchanging information about the priorities. The donor base station then preferably also has a bearer setup mechanism for constructing the radio bearer and informing the relay station of related context information.

In any system as defined above, the control messages sent via the or each second interface preferably use a secure transmission protocol in which each message is assigned to a stream using a secure transmission protocol association, and the mechanism is arranged to combine the streams into a number of radio bearers which is less than the number of streams. In such a case the relay station is preferably arranged to update the donor base station upon a change in the secure transmission protocol association. An example of such a secure transmission protocol is SCTP.

The mechanism then preferably includes a multiplexer/demultiplexer for multiplexing control messages into radio bearers for transmission via the first interface and for demultiplexing control messages received via the first interface.

The multiplexer/demultiplexer may employ fixed length partitioning of the streams, and/or a predefined pattern of spaces for streams.

Preferably also, the mechanism is arranged to form, from packets in respective ones of the streams, a new packet structured to reflect the relative priorities of the streams, and a distinctive packet header may be used to identify the new packet.

According to a second aspect of the present invention, there is provided a donor base station for use in any system as defined above.

According to a third aspect of the present invention, there is provided a relay station for use in any system as defined above.

According to a fourth aspect of the present invention, there is provided a wireless communication method comprising: subscriber stations wirelessly communicating with a relay station acting as a base station for those subscriber stations; the relay station wirelessly communicating with a donor base station via a first interface; the donor base station communicating with peer nodes and/or higher level nodes of the system, via at least one second interface; sending user data and control messages between the donor base station and the relay station by using radio bearers defined in the first interface; and via the or each second interface sending control messages with differing priorities in accordance with at least one protocol; and in the donor base station or in the relay station, combining a plurality of the control messages into one of the radio bearers by taking account of their respective priorities, for sending via the first interface.

According to a fifth aspect of the present invention, there is provided software which, when executed by a processor of a donor base station and a relay station in a wireless communication system, performs the method as defined above. Such software may be stored on a computer-readable medium.

BRIEF DESCRIPTION OF THE DRAWINGS

Reference is made, by way of example only, to the accompanying drawings in which.

DETAILED DESCRIPTION

Before describing an embodiment of the present invention, further explanation will first be made concerning a problem addressed in the embodiment. This problem concerns the way in which S1 control messages are transmitted when relay nodes RN are present in an LTE system.

Figure 6:
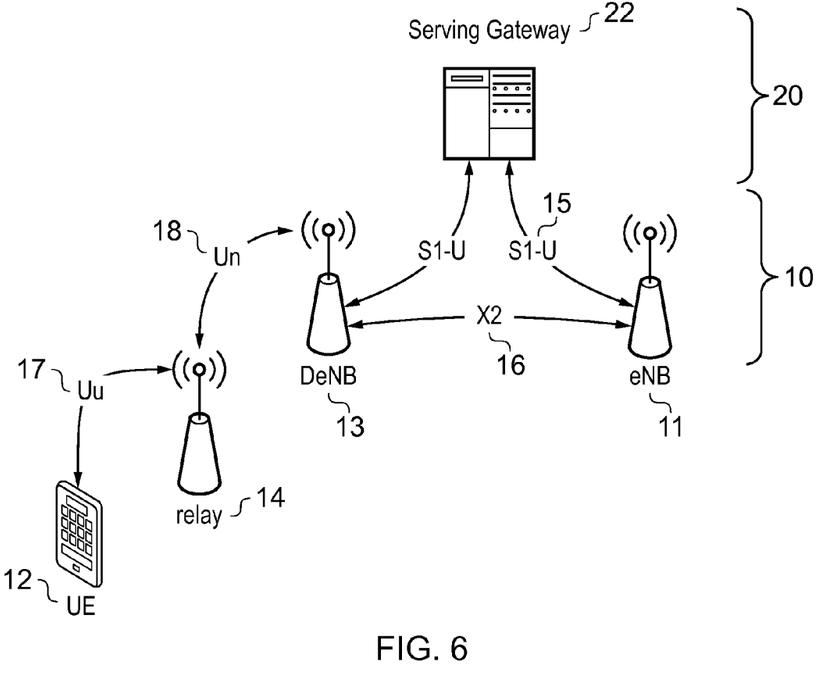
FIG. 6 shows the architecture of a LTE network employing Relay Nodes RN.

A typical LTE network with a RN is shown in FIG. 6. As already mentioned, a UE 12 is connected to a RN (relay 14 in FIG. 6) by a wireless link using the Uu radio interface. The RN 14, in turn, connects to a so-called "Donor eNB" or DeNB 13 over a wireless link via the Un interface. The Donor (or Anchor) eNB 13 may serve one or more RNs 14 and may also communicate directly with other UEs.

The User Plane data for this UE (user data traffic) is routed to the S-GW 22. Typically the S-GW is used for several eNBs 11, 13 which may be interconnected by the X2 interface, which may be a real physical connection between the eNBs, or implemented as a logical connection via other network nodes. The DeNB 13 is the eNB that is connected to the RN 14 using the radio interface (Un) and which uses similar radio resources to the Uu radio interface.

Although the RN is treated like an eNB to some extent, and thus needs to send and receive S1-AP, X2-AP and/or OAM signalling, as is clear from FIG. 6 the S1 (and possibly X2) interface is carried between the RN and its DeNB over the Un interface.

Thus, when a RN is used, many UEs will connect to the RN and certain control messages will be transmitted via the Un radio interface. In the direction from the network to the UEs these control messages will be either UE dedicated messages or broadcast control messages that can be received by multiple UEs.

Figure 7:
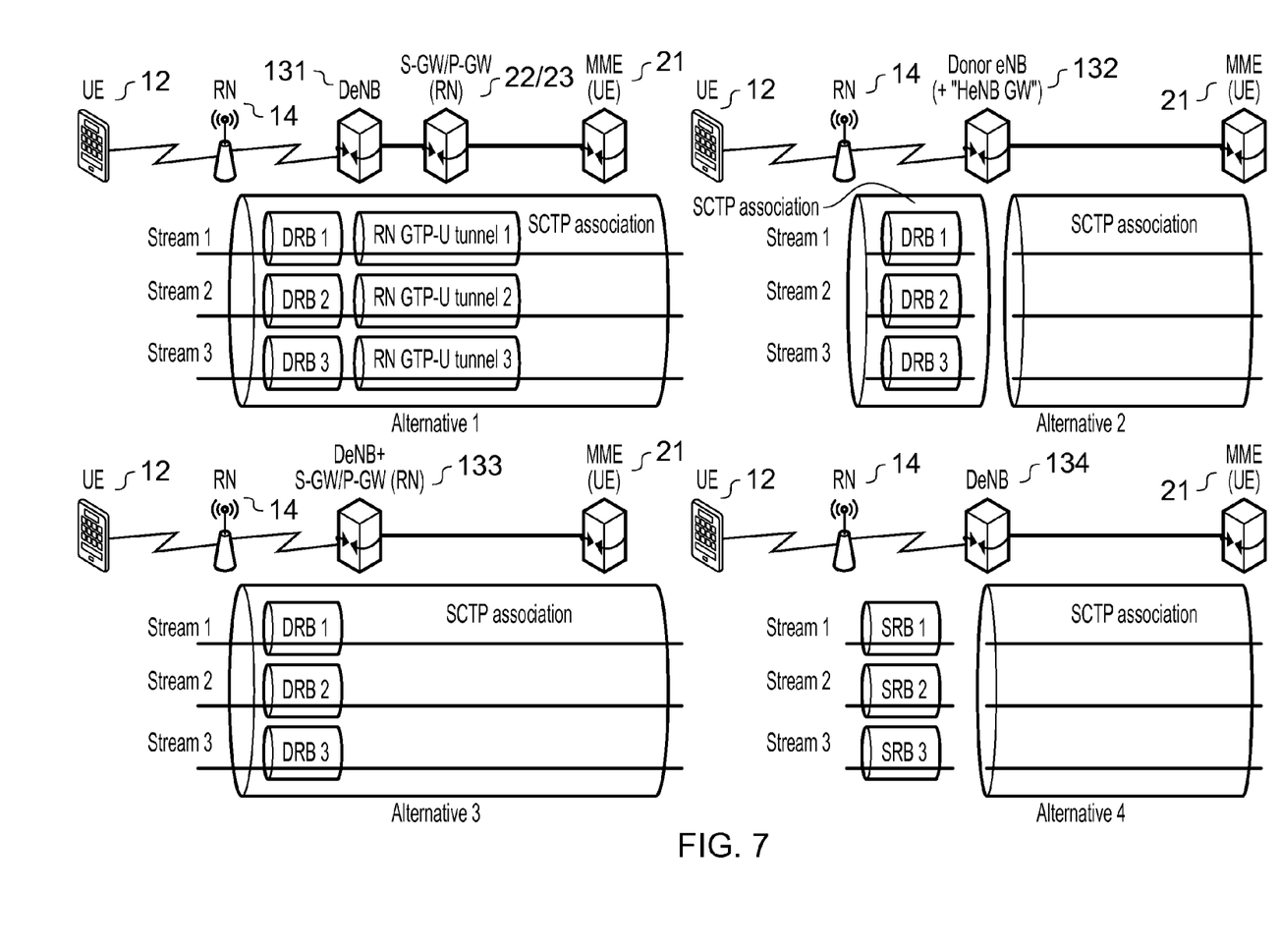
FIG. 7 shows control plane flow in an LTE system under each of four alternative system configurations.

Various configurations have been considered for a RN-equipped LTE system. These are labelled as "Alternative (or Alt) 1 to 4", where Alt 1, 2 and 3 belong to an "Architecture A", and Alt 4 to an "Architecture B". The system configurations differ in respect of the capabilities of the DeNB and RN, and in the location of the S-GW. This in turn determines how S1 signalling messages are sent, particularly to and from the RN. That is, Architecture A employs the user plane (DRBs) to transmit S1-AP and X2-AP signalling, whereas in Architecture B, the control plane (SRBs) is used. FIG. 7 shows the control plane flow for all four relay Alternatives, in which the DeNB is labelled 131 to 134 respectively to reflect its differing roles and capabilities.

Briefly, for both architecture A (Alternatives 1, 2 and 3) and architecture B (alternative 4) it is proposed that the S1-AP and X2-AP are terminated in the relay node 14, the difference between the architectures being that architecture A proposes the use of SCTP/IP and architecture B proposes the use of RRC/RLC. Another difference is that DRBs are used to carry signalling messages in architecture A, while SRBs are used in architecture B. Thus, in Architecture A the DRBs over the Un interface carry S1/X2 control plane data, i.e. S1/X2-AP messages, in addition to S1/X2 user plane data. In addition, there is the RN's OAM data making a third category of data to be mapped on the DRBs.

In more detail, in Alt 1 and 3 the S1-AP protocol terminates at the RN 14 and the signalling messages go via the DeNB 131 or 133 and the S-GW/P-GW of the RN acting as user plane transport nodes from the signalling traffic point of view. This means that the S1-AP and OAM signalling messages sent between the RN 14 and MME 21 are mapped on user plane EPS bearers of the RN; in other words they are carried by DRBs over the Un interface between the RN and its DeNB, as indicated in FIG. 7.

The RN 14 has to maintain one S1 interface relation to each MME 21 in the respective MME pool, where there is one S1 signalling connection for each connected UE 12 on the given S1 interface between the RN 14 and the MME 21 serving the UE. The S1 interface and the signalling connections span through the DeNB 131 or 133 transparently.

In this case the DeNB 131/133 also maintains its S1 interfaces and it has an S1 signalling connection corresponding to the RN 14 as a UE, going between the DeNB and the MME 21 serving the RN. Although only S1 is considered here, a similar logical structure applies also for the X2 interface relationships.

In the case of Alt 2 (proxy alternative), the S1-AP messages are sent between the MME 21 and the DeNB 132, and between the DeNB 132 and the RN 14. Upon the DeNB 132 receiving the S1-AP messages, it translates the UE IDs between the two interfaces or uses some kind of gateway functionality. This operation corresponds to an S1-AP proxy mechanism, similar to the HeNB GW function, where HeNB denotes a "Home eNB". The S1-AP proxy operation is transparent for the MME 21 and the RN 14.

That is, as seen from the MME 21, it looks like as if the UE 12 is connected to the DeNB 132, while from the RN's perspective, it looks like the RN 14 is talking to the MME 21 directly. The S1-AP messages encapsulated by SCTP/IP are transferred over an EPS data bearer of the RN 14, where the P-GW functionality for the RN's EPS bearers is incorporated into the DeNB 132 (as local breakout functionality for HeNBs).

Note also that there is an S1 interface relation and an S1 signalling connection treating the RN 14 as a UE, going from the DeNB 132 to the MME 21 serving the RN, similarly to the previous case.

As none of Alt 1, 2, or 3 require any new functionality in the S1-AP (and X2-AP) protocols, the S1-AP (and X2-AP) protocols known from conventional LTE can be employed in the relay.

Meanwhile, in Architecture B (Alt 4), the S1-AP and OAM messages are sent between the MME 21 and the DeNB 134, and between the DeNB 134 and the RN 14. Upon the DeNB 134 receiving the S1-AP messages, it translates the UE IDs between the two interfaces by means of modifying the S1-AP UE IDs in the message but leaves other parts of the message unchanged. This operation corresponds to an S1-AP proxy mechanism and is similar to the HeNB GW function. Thus, the operation is similar to Alt 2, the difference being that SRBs are used to carry the S1-AP and OAM messages in Alt 4 while DRBs are used in Alt 2 (and also in Alt 1 and 3).

The S1-AP proxy operation is transparent for the MME 21 and the RN 14. That is, as seen from the MME it looks like as if the UE 12 is connected to the DeNB 134, while from the RN's perspective it would look like as if the RN 14 is talking to the MME 21 directly. Over the Un interface, S1-AP and/or OAM (one per UE 12 served by the RN 14) is carried in new containers over RRC.

The S1-AP message is carried inside the IP/SCTP in the backhaul wire-line link, which is a multi-hop IP network, where the SCTP provides multi-streaming functionalities for its upper layer (S1-AP and X2-AP). The multi-streaming feature of SCTP is primarily used to overcome the head of line blocking problem due to congestion, packet loss or packet error during transmission over multi-hop IP routers. However, in the single RB (DRB or SRB) scenario, where multiple streams of SCTP are mapped into the same PDCP/RLC instance, the multi-streaming advantage of SCTP is negated because there is only one Tx/Rx PDCP/RLC between RN and DeNB.

When the radio link is unreliable or congested, all SCTP streams will be blocked at the same time. Therefore, the multi-streaming functionality of SCTP cannot provide the same benefits in the Un interface (single PDCP/RLC for S1-AP/X2-AP) as in the multi-hop wire-line IP network.

Under current proposals, carrying S1-AP, X2-AP and/or OAM messages requires more than one radio bearer (DRB or SRB). For example, it is suggested that at least six RBs are used for S1-AP and X2-AP messages. Ideally, multiple SCTP streams would be carried over multiple RBs, which correspond to multiple PDCP/RLC instances. However, in LTE-A there is only ever one PDC/RLC pair of entities in the eNB and RN, and a limited total number of SRBs/DRBs allowed for a single UE; accordingly, it would be desirable to reduce this requirement, in other words to send the control messages with fewer radio bearers.

In the control plane architecture for Alternatives 1 and 3, the RN 14 has a unique SCTP association in the Un interface. In order to support mapping multiple SCTP streams in the backhaul link to DRBs on the Un interface, some mechanism is required. For alternatives 1 and 3, some changes are required in core network nodes (e.g. P-GW 22) to define the SDF (Service Data Flow (template)) in order to support signalling data delivery over the User Plane.

As shown in FIG. 7, in the case of the control plane architecture for Alternative 2, there is an SCTP connection between the RN 14 and the DeNB 132, which allows mapping of the SCTP streams to DRB in the Un interface.

In the control plane architecture for Alternative 4, the S1-AP messages are transported by RRC messages in the Un interface via SRBs.

In the case of Alternatives 1 and 3, SCTP cannot provide some of the necessary information to construct the radio bearers in the DeNB, as there is no termination point for SCTP in the DeNB 131 or 133. Some information from the SCTP association will be required to create the DRBs in the DeNB. In the case of Alternatives 2 and 4, the DeNB 132/134 is aware of the SCTP association. However, some mechanism may be required to enable efficient S1-AP, X2-AP and/or OAM message delivery over the Un interface.

In any case, the S1-AP/X2-AP/OAM messages in the RN→←DeNB Un interface with different QoS requirements need to be delivered in a limited number of DRBs/SRBs. An embodiment of the present invention provides a mechanism for mapping the categorised signalling messages to different Radio Bearers over the Un radio interface. There are several important aspects to this, as follows:

(i) The combination of the identification of streams that carry the signalling messages together with the type of the control messages (e.g. S1-AP or X2-AP elementary procedures related signalling, UE dedicated procedures related UE associated signalling, OAM signalling or emergency call related signalling).

(ii) The transfer of context information from the source to the target to reduce the header overhead used for the identification of the individual components of the signalling messages (S1-AP and/or X2-AP and/or OAM).

(iii) The exchange of the SCTP association information between the DeNB and the RN (at least in the case of alternatives 1 and 3).

(iv) The use of a limited number of DRBs or SRBs for the transfer of the signalling messages.

The embodiment provides the ability to multiplex messages of differing QoS requirements (i.e. multiple QCIs—see below) in the same RB. Importantly, however, it is still possible to prioritise, for example, certain S1-AP messages over other messages by a configuration control being applied to that multiplexing.

Different S1-AP/X2-AP/OAM messages have different QoS requirements (e.g. time criticality for non-UE associated and UE associated signalling, emergency signalling, etc). In general, non-UE associated signalling is more critical and needs to be handled with a higher priority than UE associated signalling. Additionally, some network operators may categorise UEs into different service groups with different priorities. Finer categorisation of the S1-AP/X2-AP/OAM messages and different treatment of the categorised messages needs to be considered. Hence it would be desirable to map the categorised messages to different Radio Bearers over the Un radio interface.

Thus, different streams with different QoS requirements should ideally be carried on different RBs. Based on the current specifications, however, there are limited number of RBs which can be allocated to a UE, e.g. a maximum of 8 DRBs for a single UE. In the case of a Relay Node, as already mentioned this is treated as a UE that is served by a DeNB. Besides having the same general RB requirements as normal UEs, a RN also needs its DeNB to provide RBs for backhaul connections, e.g. S1 and X2.

The present embodiment addresses this problem, so that in the RN→←DeNB Un interface all the signalling messages with different QoS requirements are delivered in a limited number of DRBs/SRBs. An efficient mechanism is proposed for differentiating priorities for different types of S1-AP/X2-AP/OAM messages in order to meet these QoS requirements. This mechanism includes the following steps:

(a) If the DeNB is not aware of the SCTP association then this information needs to be transferred from the RN to the DeNB, e.g. in the case of Alternative 1 and 3. (This SCTP association is setup either between a RN and an MME which carries S1-AP messages, or between a RN and another eNB (not its DNB) which carries X2-AP messages).

(b) When the DeNB establishes a Un data radio bearer (for alternative 2) or configures a signalling radio bearer (for alternative 4) for the stream(s) which carry S1-AP/X2-AP/OAM messages, the related context information (e.g. the combination of different priority messages), is communicated to the RN. Thus, the RN is informed of the relative priorities for the purposes of the multiplexing. This includes the transfer of the information which defines the mapping of the different stream(s) which carry the signalling messages to the DRB or SRBs.

(c) Based on this information, the DeNB sets up or updates the bearers with similar parameters for both UL and DL accordingly. The parameter(s) here are mainly QoS related, which decide how to handle the related RBs.

(d) Only updates of the information about the SCTP association, set up in (a) above, need to be sent to the DeNB, thus ensuring that only the minimum overhead is required in order to identify the stream(s) which carry the signalling messages on Un interface.

More concretely, in one embodiment, there is a data multiplexing entity which allows the combination of different SCTP streams under the control of either RRC or OAM configuration. This configuration allows the de-multiplexing operation to occur in the RN and the DeNB without the need for additional headers or the use of multiple RBs for the transport of different SCTP streams.

Figure 8:
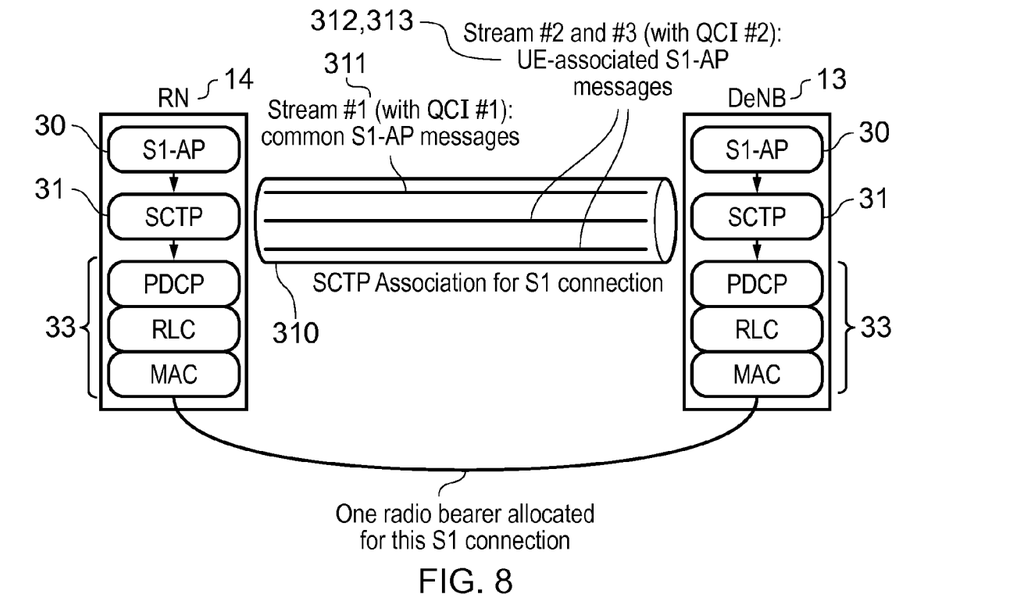
FIG. 8 shows an example of multiplexing S1-AP messages between an RN and an eNB in an embodiment of the present invention.

FIG. 8 shows an example for the communication of S1-AP messages 30 on a single RB 310 (indicated by the cylindrical shape in the Figure), over the Un interface between a RN 14 and an eNB 13. The S1-AP protocol stack is shown, in this case the data link layer 33 being divided into its constituent PDCP, RLC and MAC sublayers. In this example the single radio bearer (RB) 310 is allocated for the transport of the S1 connection over an SCTP association that consists of three streams:

Stream #1, labelled 311, (with QCI #1) for common S1-AP messages

Stream #2, labelled 312, (with QCI #2) for UE associated S1-AP messages

Stream #3, labelled 313, (with QCI #2) for UE associated S1-AP messages

Here, QCI stands for "QoS Class Identifier", and determines the relative priority of the S1-AP messages. In order to allow the prioritisation of Stream #1 some mechanism is required so that this stream 311 receives priority whilst still being transported in the same RB as the other streams 312, 313.

Figure 9:
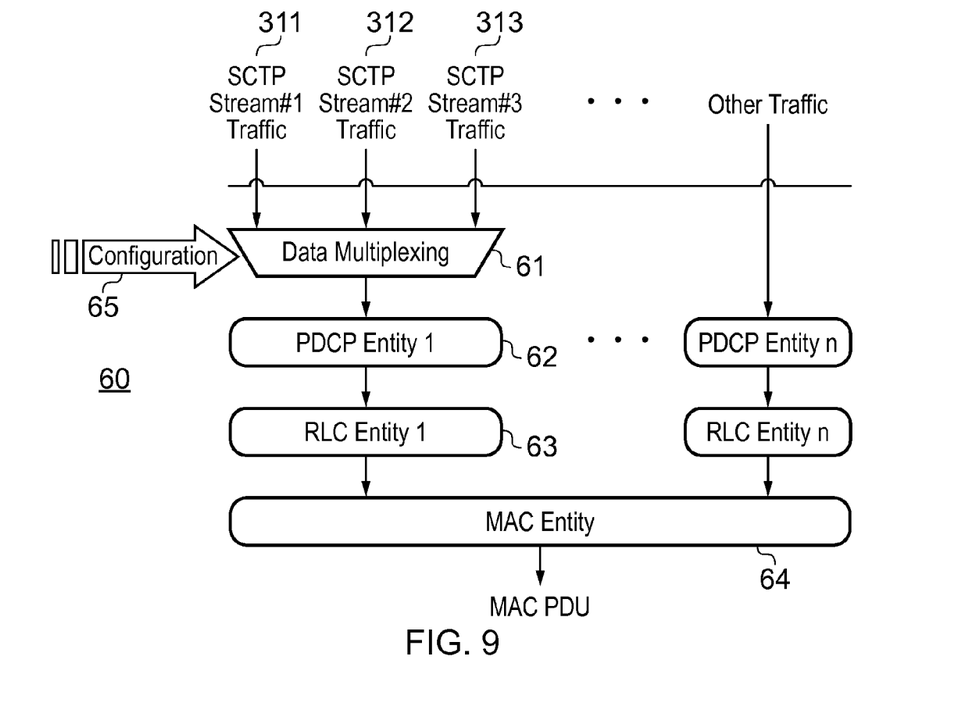
FIG. 9 shows a mechanism for combining streams in an embodiment of the present invention.

FIG. 9 shows a mechanism 60 for the combination of the three streams 311-313 shown in FIG. 8. In this picture we can see how the three streams are combined by a data multiplexing operation which is under the control of a configuration 65. As indicated in the Figure, the streams are multiplexed by multiplexer 61 at the level of the SCTP protocol layer before being sent, in turn, to a PDCP Entity 62 and RLC Entity 63 corresponding to each PDCP/RLC instance. Up to n RLC Entities are combined in a MAC Entity 64 to form the MAC PDUs which are sent over the PHY.

The same mechanism can of course be employed for combining X2-AP and/or OAM signalling messages in addition to or instead of S1-AP.

The term "mechanism" refers to any means for performing the functions specified, usually but not necessarily exclusively to software executed by a processor of the radio node concerned. In the case of the mechanism 60 of FIG. 9, this would normally be implemented by suitable programming of both the DeNB and each RN in the system.

A feature of this embodiment is that the configuration 65 of the control of the multiplexing of the schemes is applied at the initial configuration of the Un interface. It may be possible to update this configuration if the Un interface needs to be re-configured during normal RN operation.

Figure 10:
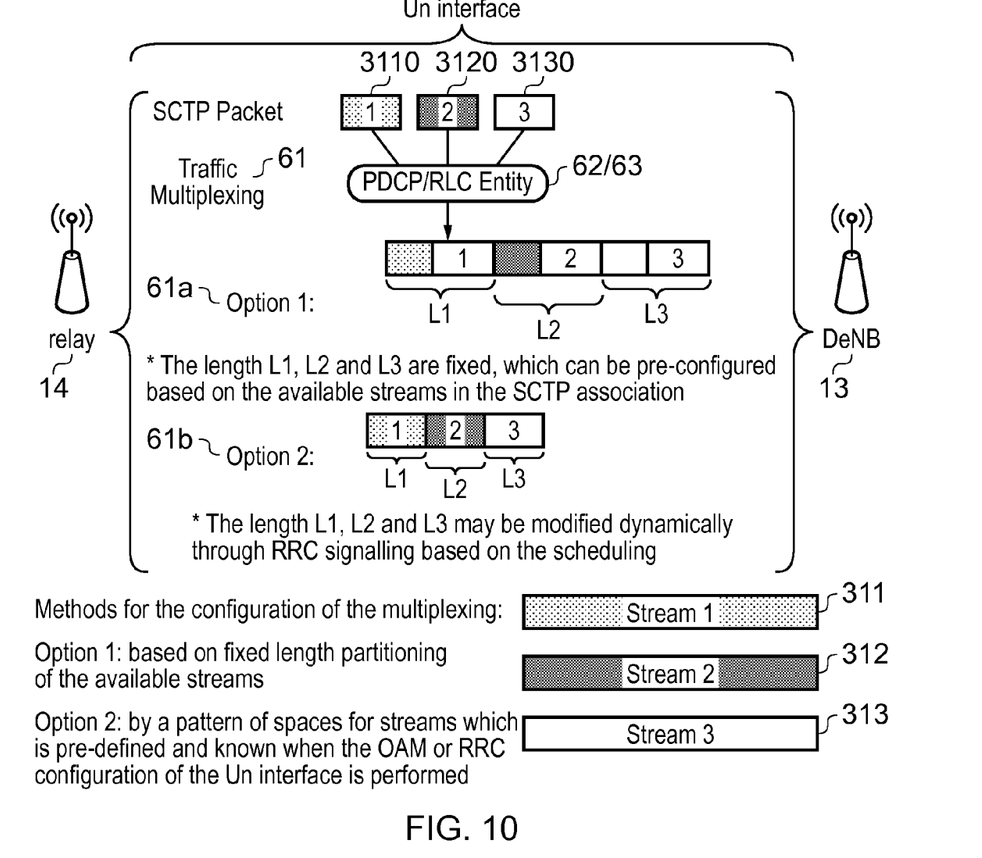
FIG. 10 shows a possible format for the combined streams in an embodiment of the present invention.

The configuration of the multiplexing can be based on fixed length partitioning of the available streams, as illustrated at 61a in FIG. 10. This shows two alternative ways in which respective packets 3110, 3120 and 3130 from the three streams shown in FIG. 9, can be multiplexed in mechanism 60.

Alternatively, the configuration of the multiplexing can be set by a pattern of spaces acting as predefined data boundaries for the streams, which pattern is known when the OAM or RRC configuration of the Un interface is performed, as indicated by 61b. In this way, higher priority S1-AP messages (for example) will always be sent first before the scheduling of lower priority S1-AP messages and/or X2 or OAM signalling in the multiplexed stream.

The control of the multiplexing of the streams needs to be performed in the RRC specifications so that these streams can be transmitted to relays in a multi-vendor deployment. RRC specifications define an open interface between an eNB and a UE, which guarantees inter-operability in such scenarios.

Figure 11:
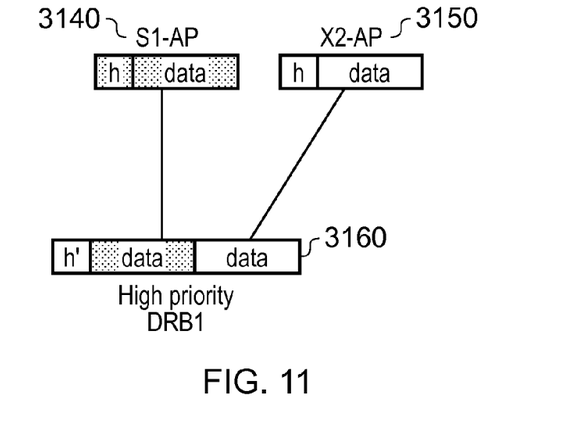
FIG. 11 shows a packet format used in an embodiment of the present invention.

FIG. 11 shows how an S1-AP packet 3140 of high priority can be multiplexed together with an X2-AP packet 3150 of lower priority in order to form a new packet format 3160 for a data bearer, such as DRB1 in FIG. 7, with a new header h' and in which the S1-AP data appears first. Note that this is only an example, and that in some instances X2-AP or OAM messages may have equal or higher priority than S1-AP. The new header h' signifies that DRB1 carries both S1-AP and X2-AP messages in this example. This signifying may include using reserved MAC bits, RRC or OAM configuration, or predefined data boundaries in the new packet format. Only an initial packet per frame will need this header, assuming there is a clear boundary defined to separate the packets with different QCIs.

Thus, to summarise, an embodiment of the present invention relates to an LTE mobile communication system in which relays are used to improve the coverage of high data rates, the cell-edge throughput and/or to increase system throughput. The problem addressed is that in the RN→←DeNB Un interface, all the signalling messages with different QoS requirements (for example different S1-AP/X2-AP messages that have different time criticalities) have to be delivered in a limited number of DRBs or SRBs. An embodiment of the present invention provides an efficient mechanism that enables the finer categorisation of different types of S1-AP/X2-AP/OAM messages and the mapping of these to a limited number of Radio Bearers over the Un radio interface.

The benefits of this mechanism include:

the efficient (in terms of radio resource usage) delivery of the S1-AP and/or X2-AP and/or OAM signalling in Un interface by use of a limited number of DRBs or SRBs;

the QoS support for signalling messages with different requirements;

the reduction of the overhead required to establish and maintain the signalling bearers for S1-AP (between a RN and a MME) and X2-AP (between a RN and an eNB) messages;

the combination of the identification of streams from multiple UEs together with the identification of UE dedicated or broadcast control messages;

the transfer of context information from the source to the target to reduce the header overhead used for the identification of the individual components of the signalling messages.

the exchange of the SCTP association information between the DeNB and the RN (at least in the case of alternatives 1 and 3).

INDUSTRIAL APPLICABILITY

The fields of application of this invention include all wired and wireless communications systems where relaying techniques are used.

What is claimed is:

1. A wireless communication system in which:
   subscriber stations (12) are arranged for wireless communication with a relay station (14) acting as a base station for those subscriber stations, wherein:
   the relay station (14) is arranged for wireless communication with a donor base station (13) via a first interface (18);
   the donor base station (13) is arranged for wired and/or wireless communication with peer nodes (11) and/or other nodes (21, 22) of the system, via at least one second interface (15, 16); and
   said first interface (18) provides radio bearers (51, 310) for sending user data and control messages between the donor base station (13) and the relay station (14); and
   the or each second interface (15,16) has at least one protocol for sending control messages with differing priorities; wherein
   the donor base station (13) and the relay station (14) each comprise a mechanism (60) to combine a plurality of said control messages into one of said radio bearers (51, 310) by taking account of their respective priorities, for sending via said first interface (18); and
   the donor base station (13) and the relay station (14) are arranged to perform a setup procedure for configuring said first interface (18), the setup procedure including exchanging information about said priorities.

2. The system according to claim 1 wherein said mechanism (60) is arranged to determine the priority of a control message from one or more of:
   a QoS requirement of the control message;
   the protocol used to send the control message via the second interface (15, 16);
   whether the control message originates from a peer node (11) or another node (22);
   whether the control message relates to a plurality of subscriber stations (12) or to an individual subscriber station; and
   whether the control message relates to an emergency.

3. The system according to claim 2 further comprising at least one organization and management node for communicating organization and management messages and wherein said mechanism (60) is arranged to further to determine the priorities based on whether the control message is an Operations, Administration, Maintenance message.

4. The system according to claim 1 wherein the donor base station (13) further comprises a bearer setup mechanism for constructing said radio bearer (51, 310) and informing the relay station (14) of related context information.

5. The system according to claim 1 wherein the control messages sent via the or each second interface (15,16) use a secure transmission protocol in which each message is assigned to a stream using a secure transmission protocol association, and said mechanism is arranged to combine the streams into a number of radio bearers (51, 310) which is less than the number of streams.

6. The system according to claim 5 wherein the relay station (14) is arranged to update the donor base station (13) upon a change in the secure transmission protocol association.

7. The system according to claim 5 wherein said mechanism (60) includes a multiplexer/demultiplexer for multiplexing control messages into radio bearers (51, 310) for transmission via said first interface (18) and for demultiplexing control messages received via said first interface (18).

8. The system according to claim 7 wherein the multiplexer/demultiplexer employs fixed length partitioning of the streams.

9. The system according to claim 7 wherein the multiplexer/demultiplexer employs a predefined pattern of spaces for streams.

10. The system according to claim 5 wherein said mechanism (60) is arranged to form, from packets in respective said streams, a new packet structured to reflect the relative priorities of the streams.

11. The system according to claim 10 wherein said mechanism (60) employs a distinctive packet header to identify the new packet.

12. A donor base station (13) adapted for use in the system according to claim 1.

13. A relay station (14) adapted for use in the system according to claim 1.

14. A wireless communication method comprising:
    subscriber stations (12) wirelessly communicating with a relay station (14) acting as a base station for those subscriber stations;
    the relay station (14) wirelessly communicating with a donor base station (13) via a first interface (18);
    the donor base station (13) communicating with peer nodes (11) and/or higher level nodes (21, 22) of the system, via at least one second interface (15, 16);
    sending user data and control messages between the donor base station (13) and the relay station (14) by using radio bearers defined in said first interface (18); and
    via the or each second interface (15,16) sending control messages with differing priorities in accordance with at least one protocol; wherein
    the donor base station (13) and the relay station (14) perform a setup procedure for configuring said first interface (18), the setup procedure including exchanging information about priorities of the control messages; and
    the donor base station (13) or the relay station (14) combine a plurality of said control messages into one of said radio bearers (51, 310) by taking account of their respective priorities, for sending via said first interface (18).

* * * * *